United States Patent [19]

Tomlinson et al.

[11] 4,216,538
[45] Aug. 5, 1980

[54] NAVIGATION AID

[76] Inventors: Peter Tomlinson, 5 Deans Quarry, Burleigh Stroud, Glos. GL5 PQ, England; Dennis Healy, 4 Warfield Rd., Bracknell, Berkshire, England

[21] Appl. No.: 939,772

[22] Filed: Sep. 5, 1978

[30] Foreign Application Priority Data

Sep. 17, 1977 [GB] United Kingdom ............... 38850/77

[51] Int. Cl.² ........................... G01S 7/54; G01S 9/68
[52] U.S. Cl. ........................................ 367/89; 367/95; 367/97; 367/108; 343/5 BD
[58] Field of Search ............... 340/1 R, 1 C, 3 C, 3 R, 340/5 S; 343/5 BD

[56] References Cited

U.S. PATENT DOCUMENTS

| 3,673,553 | 6/1972 | Miura et al. ............... 340/5 S X |
| 3,980,983 | 9/1976 | Shannon ............... 340/3 R |

FOREIGN PATENT DOCUMENTS

| 988798 | 4/1965 | United Kingdom ............... 340/3 R |
| 1384647 | 2/1975 | United Kingdom ............... 340/3 C |

OTHER PUBLICATIONS

Kritz et al., *Navigation*, vol. 16, No. 1, 1969, pp. 3–20.

Primary Examiner—Richard A. Farley
Attorney, Agent, or Firm—Cushman, Darby & Cushman

[57] ABSTRACT

A navigation aid for determining berthing data comprises distance detecting units embodying sonar transducers which are spaced apart along the length of a jetty a short distance behind the berthing line. The units are operative to provide signals indicative of the distance from the berthing line of correspondingly spaced sections of the ship, and a microcomputer selects two out of three of these signals and processes them to determine the distance from the berthing line of nominal bow and stern sections of the ship, the nominal measuring points being different from the actual measuring points at which the transducers are positioned. The microcomputer also processes the selected signals to determine the velocity of the bow and stern sections relative to the berthing line, and controls a jetty display of the determined distance and velocity data in addition to local and remote indications/recordal thereof.

9 Claims, 2 Drawing Figures

NAVIGATION AID

BACKGROUND OF THE INVENTION

1. Field of the Invention

This invention relates to navigation aids of the type which determine berthing data to assist the pilot of a ship during a berthing operation.

2. Description of the Prior Art

Such aids are in use to provide pilots, particularly the pilots of large ships such as super tankers and bulk ore carriers, with information as to the angle of the ship with respect to the jetty, the distance of the ship therefrom, and the speed of approach. Aids of this type are disclosed in U.S. Pat. No. 3,673,553, and U.K. Pat. No. 1,384,647. Installations are in use which provide a visual display of this data on the jetty within sight of the pilot, one such installation being described in the aforesaid U.K. Pat. No. 1,384,647, although alternatively the data may be transmitted by radio to the pilot on board ship. The data is derived from two distance detecting units normally empolying underwater sonar transducers and spaced apart so as to detect the distance from the jetty of respective bow and stern sections of the ship, normally referred to as the "fore and aft distance off" measured at bow and stern fenders on the jetty. Although such installations in general perform very satisfactorily problems have been encountered when, due to manoeuvring of the ship with resultant turbulence at the stern region or other causes, the signal from a detecting unit is materially affected or in some cases lost altogether.

SUMMARY OF THE INVENTION

The object of the invention is to provide a navigation aid of the type concerned with which the foregoing problems are effectively overcome.

According to the invention a navigation aid for determining berthing data comprises distance detecting units spaced apart along the length of a jetty and operative to provide signals indicative of the distance from the jetty of correspondingly spaced sections of the ship, and signal processing means to process the signals from the units and operative to determine at least the distance from the jetty of two sections of the ship the spacing of which lengthwise of the ship is greater than that of said units. Thus the effective nominal measuring point of at least one of the units is different from the actual measuring point at which it is positioned.

Preferably the determined data is visually displayed on the jetty as in the installation described in our said Specification U.S. Pat. No. 1,384,647, with such data relating to nominal bow and stern sections of the ship the effective measuring points of which may be determined by jetty fender positions. One of the units may be positioned to determine the distance of the bow section directly, with the spacing between the units less than that of the bow and stern measuring points and the distance detected by the other unit in effect extrapolated by said signal processing means to provide a determined distance relating to the stern section measuring position. In a preferred embodiment, however, both units are positioned opposite inwardly spaced sections of the ship, preferably symmetrically with respect to the centre thereof, so that both detected distances are in effect extrapolated so as to relate respectively to bow and stern sections.

The signal processing means preferably comprise a microcomputer or microprocessor, programmed appropriately to process the signals and to drive a large visual display visible from on board ship and this display may include determined velocities relative to the measuring points with different coloured signal lights referring to velocity ranges. The microcomputer may also drive local and remote digital indicators, a cassette recorder and an alpha-numeric printer.

Three or more distance detecting units may be spaced apart along the length of the jetty, two of these units being operative at any one time. The arrangement in this case may be such that in the event of a loss or distortion of the reflected signal at one unit another unit is automatically alternatively brought into operation and the signal therefrom appropriately processed. Thus, for example, an installation may comprise three units two of which are positioned in the normal manner to determine directly the spacing of bow and stern sections, these two normally being operative with the third unit positioned between them inoperative. In the event of excessive turbulence at the stern section for example, with the corresponding sonar reflected signal lost or distorted, the intermediate unit is switched into operation and the signal processing means process the signal thereof so that the determined distance is still that of the stern section and continuity of data display is maintained. However, it is preferred that all three or more units be positioned between the nominal bow and stern measuring points, and two of them selected for distance determination at any one time.

For protection the units will normally be set back some distance from the berthing line, and the signal processing means process the signals in a manner which allows for this. Fender deflection, with consequent approach of the ship beyond the berthing line, may then be detected and indicated.

Other features of the invention will be apparent from the following description, drawings and claims, the scope of the invention not being limited to the drawings themselves as the drawings are only for the purpose of illustrating a way in which the principles of the invention can be applied. Other embodiments of the invention utilising the same or equivalent principles may be used and structural changes may be made as desired by those skilled in the art without departing from the present invention and the purview of the appended claims.

DESCRIPTION OF THE PREFERRED EMBODIMENT

Figure 1:
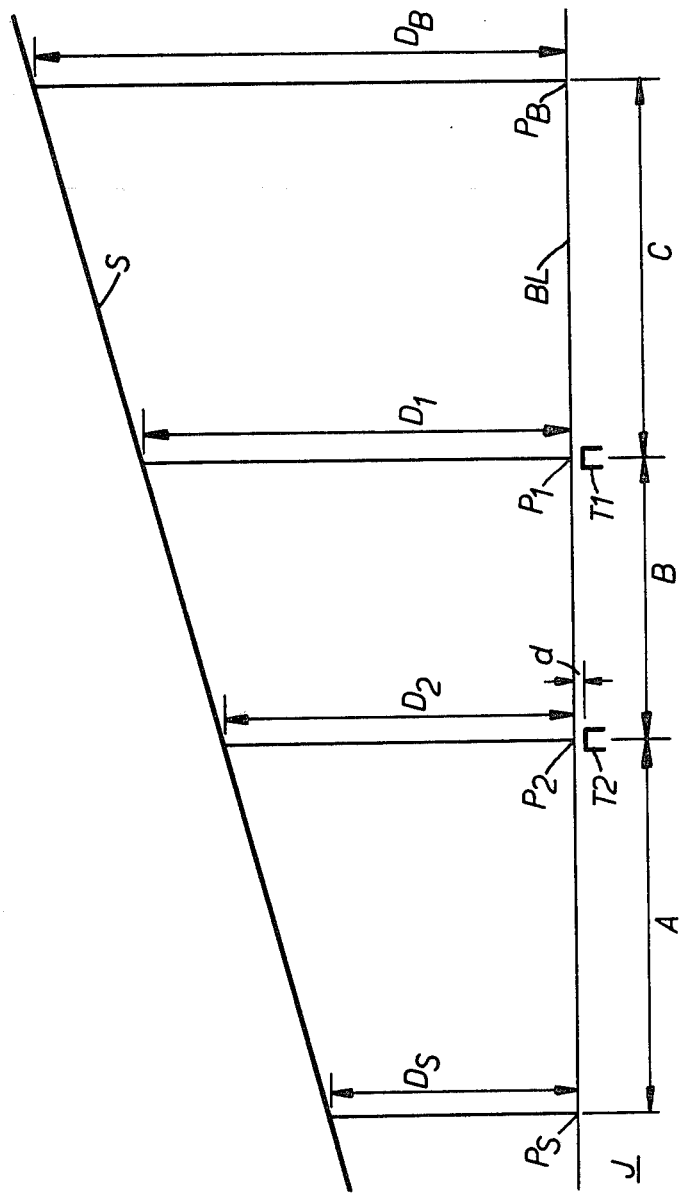
FIG. 1 illustrates a ship and jetty during a typical berthing operation, showing the positioning of two distance detecting units of a navigation aid according to the invention.

In FIG. 1 the side of the ship is illustrated diagrammatically at S and the berthing line of the jetty J is shown at BL. Two underwater distance detecting units incorporating sonar transducers T1 and T2 are shown mounted on the jetty J, being spaced apart along the length of the jetty and positioned adjacent but a distance d slightly behind the berthing line, and arranged to transmit sonar pulses at right angles thereto at direct measuring points $P_1$ and $P_2$ on the jetty. The sonar transit times between pulse transmission and reception of reflected pulses back from the hull of the ship are respectively indicative of the spacings $D_1$ and $D_2$ between the transducers T1, T2 and the ship S. These signals are extrapolated, in a manner to be described, by the signal processing means of FIG. 2, to determine the distances $D_B$ and $D_S$ of bow and stern sections of the ship S from the berthing line BL, i.e. at the effective nominal measuring points $P_B$ and $P_S$.

It can readily be shown geometrically that $$D_B = D_2 + B + C/B(D_1 - D_2) \quad (1)$$

and $$D_S = D_2 - A/B(D_1 - D_2) \quad (2)$$

where A, B and C are the spacing between the transducers along the jetty as marked in FIG. 1, and if s = speed of transmission of sonar pulses, then from equations (1) and (2)

$$D_B = (s/2)T_2 + B + C/B(T_1 - T_2)s/2 \quad (3)$$

and $$D_S = (s/2)T_2 - A/B(T_1 - T_2)s/2 \quad (4)$$

where $T_1$ and $T_2$ are respectively the time delays between pulse transmission and reception at the transducers T1 and T2.

It will be appreciated that considerable simplification results if A = B = C, which is one preferred arrangement of two transducers when equations (3) and (4) become:

$$D_B = s/2(2T_1 - T_2) \quad (5)$$

$$D_S = s/2(2T_2 - T_1) \quad (6)$$

Figure 2:
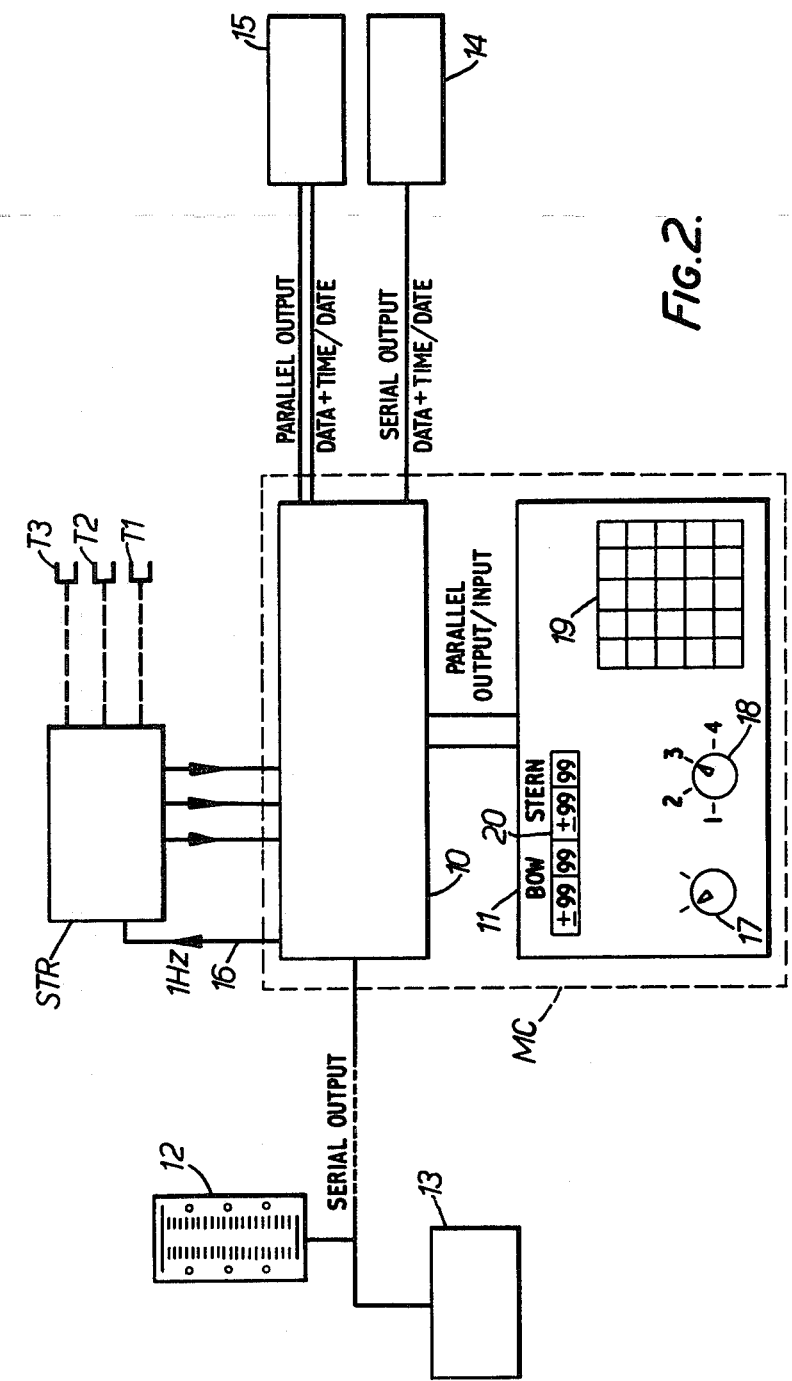
FIG. 2 is a block diagram of the complete navigation aid.

Referring now to the block diagram of FIG. 2, the complete system comprises a sonar transmit/receive unit STR connected to three transducer units T1, T2 and T3, and to a microcomputer unit MC comprising a microcomputer 10 and control panel 11. All three units T1, T2 and T3 are positioned between the nominal measuring points $P_B$ and $P_S$ so that they operate as "phantom" transducers providing signals used to determine the distances $D_B$ and $D_S$ at points other than those at which they are positioned. The microcomputer 10 provides a serial output to drive a remote visual display unit 12 on the jetty and a remote digital indicator 13. A separate serial output drives a cassette recorder 14, and a parallel output drives an alpha-numeric printer 15.

The software of the microcomputer 10 provides a 1 Hz strobe output on line 16 at the interface with STR, and all processing within the microcomputer is reiterative upon this 1 Hz rate. A trigger signal at TTL level is provided to fire the sonar transducers, and the microcomputer measures the duration between this transmission and the reception of reflected return signals by utilising a cyclic software count. This count is interrupted by the return signals and the count values, representative of the actually measured distances to the ship S, are processed to provide a range measurement of bow and stern sections. The next transmission and return signals from the same transducers, occurring one second later, enable the microcomputer to make an initial calculation of ship velocity towards the berthing line.

The system operates with two out of the three transducers T1, T2 and T3 operative at any given time. The software is, in general, able to differentiate between true and false sonar echoes, and the microcomputer continually samples the sonar signals and selects the best two out of the three for range and velocity determination.

Thus if the return signal from one of the two sonar transducer units at any given time in use is lost or seriously affected, the other transducer unit is automatically brought into effective use and utilised instead. The cyclic software counts corresponding to the two units in use are processed by the microcomputer 10 to determine the nominal measured distances $D_B$ and $D_S$ in accordance with the corresponding equation (3) or (4), or (5) or (6), derived above.

It will be appreciated that the use of three phantom transducers is merely exemplary. The two shown in FIG. 1 may be used alone, or four or any greater number with the system at all times selecting the best two for signal processing.

Any suitable count pulse frequency may be used, but advantageously this is such that the respective counts equal the distance concerned in length units. In conditions of average salinity and temperature the velocity of sound in salt water is approximately 1500 meters per second. A fixed pulse frequency could result in a reduction in the accuracy of measurement unless some form of compensatory device is included. Hence the system is capable of adjusting the pulse frequency or the processing constants according to any given set of operational parameters and their expected deviation.

The microcomputer 10 performs calculations of vessel range and velocity from a maximum range of 200 meters. The hardware configuration is such that the visual display 12 and indicator 13 are driven only when the vessel is within 100 meters range, whereas the cassette recorder 14 and printer 15 are initiated from the full 200 meters range. Fender deflection is represented as a determined negative range at the bow and stern measuring points, i.e. determined ship movement beyond the berthing line BL. This negative range information is outputed every second, whereas the normal printer output rate is conveniently every ten seconds. Once a one-second output rate is initiated by the software, this rate of output is continued for the remainder of the berthing operation.

In a typical system, the total system accuracy gives range discrimination to within 1 cm for target ranges between 0 and 20 meters. Velocity accuracy over this range is within 1 cm per second, and it will be appreciated that the software may be extended to determine acceleration towards the berthing line from successive one-second changes in the cyclic software count. The outputs distinguish between positive and negative velocities, and accelerations when determined, towards the berthing line BL. The outputs to the recorder 14 and printer 15 include time and date information, and the microcomputer system includes a real time clock circuit providing an accurate counter scaled to count minutes, hours, days and months as well as producing the 1 Hz strobe signal used as a stroke for the sonar transducers via the STR unit.

The control panel 11 has an ON/OFF switch 17, a multiposition switch 18 which enables the system to be switched to any one of a number of jetties with which it is alternatively used, a keyboard 19 positioned behind a lockable flap, and a digital LED display 20. The keyboard 19 is used to preset inputs into the microcomputer memory, these largely being jetty configuration dependent but also enabling test rountines to be established. The keyboard 19 also provides a facility for system clock adjustment, and typical preset inputs are the distances between the transducers, the average datum temperature value appropriate to the geographical site, which affects the sound velocity, and control parameters for the jetty display 12 which is of a scale such that it is visible to a pilot on board the ship. The switch 18 selects the correct microcomputer memory inputs for the preset parameters of the jetty selected in conjunction with the appropriate transducer set.

The panel display 20 has four LED numeric displays, range and velocity for the bow section and range and velocity for the stern section of the ship. The jetty display 12 is generally as described in our said Specification No. 1,384,647 and well known as "The IDASAT" (Integrated Distance and Speed and Tilt) Berthing Display, and it is not illustrated in detail in the drawings. It is an integrated symmetrical visual display with an illuminated Jetty Datum line at the top and an illuminated Distant Datum (for example 100 meters) at the bottom. Two vertical columns of distance bars respectively representative of bow and stern section ranges extend between the Jetty and Distant Datum lines and they are progressively illuminated (intense white) as the ship approaches the jetty.

At each side of the display there is a vertical row of three (respectively green, amber and red) indicator lights, one row for the bow section and one for the stern section, and these are illuminated according to the computer programming to indicate velocity ranges. A steady green indicator light indicates that the ship is within a programmed safe speed range; a flashing amber indicator light indicates a marginally safe speed range; and a flashing red indicator light indicates a dangerous speed range.

The system as described for normal berthing operation can be modified for use for Dry Docking Sonar Systems with only software changes.

We claim:

1. A navigation aid for determining berthing data comprising two distance detecting units spaced apart along the length of a jetty and operative to provide signals indicative of the distance from the jetty of corresponding spaced sections of a ship, and signal processing means to process the signals from the units and operative to determine therefrom at least the distance from the jetty of two sections of the ship the spacing of which lengthwise of the ship is greater than that of said units.

2. A navigation aid according to claim 1, wherein said signal processing means are also operative to determine the velocity of said two sections of the ship towards the jetty.

3. A navigation aid according to either one of the preceding claims, wherein said distance detecting units are positioned a small distance behind a berthing line defined by fenders on the jetty, and said signal processing means are operative to determine from said signals the ship distances with respect to the berthing line, in a manner such as to indicate fender deflection.

4. A navigation aid according to claim 1, wherein the distance detecting units comprise sonar transducers.

5. A navigation aid according to claim 1, wherein display means by which the determined data is visually displayed are mounted on the jetty so as to be visible to a pilot on the ship during a berthing operation.

6. A navigation aid according to claim 1, wherein said distance detecting units are both positioned at actual measuring points on the jetty different from and disposed between the nominal effective measuring points to which the determined data relates.

7. A navigation aid according to claim 1, wherein at least one additional distance detecting unit is mounted on the jetty and the signal processing means automatically select for processing the best two signals for this purpose from the signals from all the units.

8. A navigation aid according to claim 1, comprising a microcomputer providing said signal processing means, a sonar transmit/receive unit controlled by and providing the signal inputs for the microcomputer, and local and remote ship distance and velocity indicating and/or recording means driven by the microcomputer.

9. A method of determining the distances of spaced sections of a ship from respective nominal measuring points on a jetty during a berthing operation, comprising transmitting underwater sonar signals from two spaced actual measuring points on the jetty at least one of which is differnt from and disposed between the nominal measuring points, receiving the reflected sonar signals and from the time delay between transmission and reception of the sonar signals producing signals representative of the actual measured distances, and processing the latter signals to determine the distances of the ship from said nominal measuring points.

* * * * *